United States Patent
Deen et al.

(10) Patent No.: US 8,418,763 B1
(45) Date of Patent: Apr. 16, 2013

(54) SELF-DEGRADING CEMENT COMPOSITIONS AND ASSOCIATED FLUID LOSS APPLICATIONS

(75) Inventors: Larry R. Deen, Spring, TX (US); Donald L. Whitfill, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/458,024

(22) Filed: Apr. 27, 2012

(51) Int. Cl.
*E21B 33/138* (2006.01)

(52) U.S. Cl.
USPC .................. 166/293; 166/281; 166/300

(58) Field of Classification Search ............ None
See application file for complete search history.

(56) References Cited

U.S. PATENT DOCUMENTS

| | | | |
|---|---|---|---|
| 4,108,779 A * | 8/1978 | Carney | 507/108 |
| 5,220,960 A | 6/1993 | Totten et al. | |
| 5,281,270 A | 1/1994 | Totten et al. | |
| 5,588,489 A | 12/1996 | Chatterji et al. | |
| 5,711,801 A | 1/1998 | Chatterji et al. | |
| 5,820,670 A | 10/1998 | Chatterji et al. | |
| 5,875,845 A | 3/1999 | Chatterji et al. | |
| 5,897,699 A | 4/1999 | Chatterji et al. | |
| 6,063,738 A | 5/2000 | Chatterji et al. | |
| 6,210,476 B1 | 4/2001 | Chatterji et al. | |
| 6,664,215 B1 | 12/2003 | Tomlinson | |
| 7,032,663 B2 | 4/2006 | Nguyen | |
| 7,044,222 B2 | 5/2006 | Tomlinson | |
| 7,044,224 B2 | 5/2006 | Nguyen | |
| 7,172,022 B2 | 2/2007 | Reddy et al. | |
| 7,497,258 B2 | 3/2009 | Savery et al. | |
| 7,789,149 B2 | 9/2010 | Santra et al. | |
| 2008/0070810 A1 * | 3/2008 | Mang | 507/219 |
| 2010/0282466 A1 | 11/2010 | Brenneis et al. | |

OTHER PUBLICATIONS

Halliburton brochure entitled "AQF-2™ Foaming Agent," 2008.
Halliburton Product Data Sheet entitled "Baracarb® Bridging Agent," 2010.
Halliburton brochure entitled "HC-2™ Agent," 2009.
Halliburton brochure entitled "Howco-Suds™," 2007.
Halliburton brochure entitled "ThermatekSM Service, Helps meet the challenges of severe lost circulation, near wellbore water shutoffs and plugging operations," 2005.

* cited by examiner

*Primary Examiner* — Zakiya W Bates
(74) *Attorney, Agent, or Firm* — Craig W. Roddy; McDermott Will & Emery LLP

(57) ABSTRACT

Cement compositions and methods of their use in subterranean applications include the use of a self-degrading cement composition for use in fluid loss applications. A method includes placing a self-degrading cement composition in at least one fracture of a subterranean formation, the self-degrading cement including a cement composition including an acid-base cement, a particulate filler, and a solid acid precursor. The method includes allowing the self-degrading cement to set in the fracture.

13 Claims, No Drawings

SELF-DEGRADING CEMENT COMPOSITIONS AND ASSOCIATED FLUID LOSS APPLICATIONS

BACKGROUND

The present invention relates to cement compositions and methods of their use in subterranean applications. More specifically, the present invention relates to the use of a self-degrading cement composition for use in fluid loss applications.

Lost circulation involves the loss of drilling or cementing fluids into formation voids during drilling, circulation, running casing, or cementing operations. Zones of high porosity and/or permeability, rubble zones, gravel and other natural voids may all cause fluid loss into the formation. In some circumstances, lost-circulation problems are caused in depleted zones where the formation pore pressure is lower than that of the upper portion of the formation. In such cases, increases in hydrostatic pressure may fracture weak formations and lead to lost circulation. Fluid loss to thief zones may also be problematic, for example, during cementing operations where water loss to such zones may result in the formation of a dehydrated cement bridge. The concomitant lowering of hydrostatic pressure below such a bridge may cause formation gases to bubble up through the cement resulting in channeling through the cement column and up to the surface of the formation. To prevent fluid loss in these various situations, a lost circulation material (LCM) is typically employed.

LCMs are diverse in nature and include, for example, various bridging agents in granular, fiber, or flake form, crosslinkable polymers, and swellable polymers. Some LCMs may be added directly to the drilling or cement composition. LCMs and chemical products specifically designed to treat fluid loss include, for example, cellulose, almond hulls, black walnut hulls, dried tumbleweed, kenaf, paper, asphalt and both coarse and fine rice. Another method involves pumping a powdered bentonite-diesel oil pill and chasing it with water. The pill forms a semi-solid mass that may stem severe fluid loss. Bentonite may also be mixed with polymers to form a pliable gel in the presence of water. These LCMs may provide relief in moderate fluid loss situations, but many are inadequate to restore fluid circulation in situations involving severe fluid loss.

Among LCM materials, various cement compositions are also commonly employed. Fluid loss control during cementing operations, in particular, may employ rapid-set or thixotropic cement, or lightweight cement systems. However, current cement compositions employed in fluid loss prevention applications may lack sufficient compressive strength and/or may have setting times that are too long, limiting their usefulness in severe fluid loss situations. Moreover, cements employed in severe fluid loss situations may also lack degradability, which may render the cemented zone relatively impermeable, thus limiting access to the formation fluids. This lack of accessibility may necessitate further costly operations to gain access to these zones.

SUMMARY OF THE INVENTION

The present invention relates to cement compositions and methods of their use in subterranean applications. More specifically, the present invention relates to the use of a self-degrading cement composition for use in fluid loss applications.

In some embodiments, the present invention provides a method comprising placing a self-degrading cement composition in at least one fracture of a subterranean formation, the self-degrading cement comprising an acid-base cement, a particulate filler, and a solid acid precursor, and the method comprising allowing the self-degrading cement to set in the fracture.

In some embodiments, the present invention provides a method comprising placing a self-degrading cement composition in at least one thief zone within a subterranean formation, the self-degrading cement comprising an acid-base cement, a particulate filler, and a solid acid precursor, and the method comprising allowing the self-degrading cement to set in the thief zone to prevent fluid loss therefrom.

In some embodiments, the present invention provides a self-degrading cement for fluid loss control comprising a cement composition comprising an acid-base cement, a particulate filler, and a solid acid precursor.

The features and advantages of the present invention will be readily apparent to those skilled in the art upon a reading of the description of the preferred embodiments that follows.

DETAILED DESCRIPTION

The present invention relates to cement compositions and methods of their use in subterranean applications. More specifically, the present invention relates to the use of a self-degrading cement composition for use in fluid loss applications.

The present invention provides methods that employ cement compositions that have rapid setting times and high compressive strength for effective fluid loss control, even in severe fluid loss situations. In some embodiments, setting times may be as short as five to ten minutes. Such short setting times may be valuable in operations involving severe fluid loss where stemming fluid loss to the surrounding formation may avert, for example, environmental contamination of a water table. Moreover, short setting times can reduce drilling times, which may help reduce costs. In addition to short setting times, the high compressive strength of set self-degrading cement compositions of the invention provide for a method suitable for stabilizing weaker formations to prevent fluid loss arising due to changes in hydrostatic pressures. Self-degrading cement compositions employed in methods of the invention may advantageously utilize various components in fiber forms that are conducive to enhancing compressive strength such as continuous or chopped tow or yarn-like materials.

Moreover, the ability of the set cementing composition to self degrade provides controlled access to the cemented zones. Such degradative access may occur naturally over time or may be optionally accelerated by exposing the set cement to various treatment fluids, formation fluids, and/or by controlling temperature. Self degradation enhances the permeability of the resultant set cement sheath to a degree that may facilitate greater flow of formation fluids, such as hydrocarbons, to the well bore. In some embodiments, the intimate mixing of an acid degradable particulate filler and an acid precursor provide for degradation that is substantially uniform in porosity.

In some embodiments, the present invention provides a method comprising placing a self-degrading cement composition in at least one fracture of a subterranean formation, the self-degrading cement includes an acid-base cement, a particulate filler, and a solid acid precursor, and the method comprising allowing the self-degrading cement to substantially set in the fracture. Methods of the invention may be used in any fluid loss control situation in a subterranean environment, including in severe lost circulation. This is facilitated by the rapid setting times of the compositions disclosed herein.

In some embodiments, methods of the invention include the use of cement compositions with setting times in a range from about 1 minute to about 300 minutes, including any value in-between and fractions thereof. In some embodiments, the setting time of the cement composition is in a range from about 5 minutes to about 10 minutes. One skilled in the art will recognize the ability to tune the setting time according to the composition and with appropriate choice for the particular application. Rapid setting times are useful in, for example, situations involving severe fluid loss.

In some embodiments, the present invention provides a self-degrading cement for fluid loss control comprising a cement composition comprising an acid-base cement, a particulate filler, and a solid acid precursor.

As used herein, the term "fracture" refers to any formation void structure from which fluid loss occurs and is desirably blocked with self-degrading cement compositions disclosed herein. Such fractures may be naturally occurring, in some embodiments, and may include, without limitation, thief zones, zones of high porosity and/or permeability, rubble zones, gravel and other natural voids such as fractures and vugs in carbonate formations. In some embodiments, "fractures" may include non-naturally occurring fractures created purposefully in various operations, such as fractures created by a perforation gun, fractures created by hydraulic fracking, and the like.

The acid-base cement may be any acid-base cement known in the art, including acid-base cements used in other industries, such as acid-base cements employed in dental applications such as calcium phosphate acid-base cements. As used herein, "acid-base cement" refers to any cement that comprises an acid source and a base source capable of reacting to form a set cement. In some embodiments, the acid-base cement comprises any combination of a Lewis acid (electron pair acceptor) with a Lewis base (electron pair donor). In some embodiments, the acid-base cement is a non-hydraulic cement. Non-hydraulic cements may be created, for example, using materials such as non-hydraulic lime and gypsum plasters, and oxychloride, which has liquid properties.

A broad variety of acid sources and base sources may be suitable for use in the self-degrading cement compositions of the present invention. Examples of suitable acid sources include, inter alia, magnesium chloride ($MgCl_2$), potassium phosphate monobasic ($KH_2PO_4$), phosphoric acid ($H_3PO_4$), magnesium sulfate ($MgSO_4$), and ammonium phosphate monobasic ($NH_2PO_4$). Examples of suitable base sources include, inter alia, magnesium oxide (MgO), calcium oxide (CaO) and ammonia ($NH_3$). An example of a suitable source of magnesium oxide is commercially available from Martin Marietta under the trade name "MagChem 10." An example of a suitable source of potassium phosphate monobasic is commercially available from Fisher Scientific.

Generally, an acid source and base source may be chosen that may react so as to form an acid-base cement. For example, magnesium oxide may be chosen as a base source, and potassium phosphate monobasic may be chosen as an acid source, so that in the presence of water they may react to produce an acid-base cement having the chemical formula $MgKPO_4$—$OH_2O$. As another example, magnesium oxide may be chosen as a base source, and magnesium chloride may be chosen as an acid source, so that in the presence of water they may react to produce acid-base cement having three oxychloride phases; one oxychloride phase may have the chemical formula 5 $Mg(OH_2)MgCl_2$-$8H_2O$, which may be referred to as "5-form." As another example, magnesium oxide may be chosen as a base source, and phosphoric acid may be chosen as an acid source, so that in the presence of water they may react to produce an acid-base cement having the chemical formula $MgHPO_4$-$8H_2O$. As still another example, magnesium oxide may be chosen as a base source, and magnesium sulfate may be chosen as an acid source, so that in the presence of water they may react to produce an acid-base cement having four possible oxysulfate phases; one oxysulfate phase may have the chemical formula 3 $Mg(OH)_2MgSO_4$-$8H_2O$, which may be referred to as "3-form." As still another example, magnesium oxide may be chosen as a base source, and ammonium phosphate monobasic may be chosen as an acid source, so that in the presence of water they may react to produce an acid-base cement having the chemical formula $Mg(NH)_4PO_4$—$OH_2O$. A broad variety of acid sources and base sources may be used, and a broad variety of acid-base cements may be produced, in accordance with the present invention, including, but not limited to, phosphate cements, oxy-chloride and oxy-sulfate cements. Phosphate cements may include without limitation, an acid source that is a monobasic, dibasic, and/or tribasic phosphate salt with counterions sodium, potassium, magnesium, zinc, aluminum or combinations thereof. Any such acid source or combination of acid sources may be combined with a metal oxide as a base source, including, without limitation, oxides of magnesium, zirconium, potassium, sodium, zinc, or combinations thereof.

Generally, the acid source and base source may be present in a stoichiometric amount. For example, in certain embodiments of the present invention wherein magnesium oxide is used as a base source and potassium phosphate monobasic is used as an acid source, their relative concentrations may be illustrated by EQUATION 1 below.

$$0.15 \text{ grams MgO} + 0.52 \text{ grams KH}_2\text{PO}_4 + 0.33 \text{ grams H}_2\text{O} \sim \text{*1 gram MgKPO}_4\text{—OH}_2\text{O}. \quad \text{EQUATION 1}$$

EQUATION 1 is merely exemplary, and may be modified as one of ordinary skill in the art will recognize, with the benefit of this disclosure. For example, additional quantities of magnesium oxide may be included, in amounts in the range of from about 1% excess by weight to about 25% excess by weight, including any value in-between or fractions thereof.

In some embodiments, methods of the invention provide an acid-base cement that includes at least one acid source selected from the group consisting of magnesium chloride ($MgCl_2$), zinc chloride ($ZnCl_2$), potassium phosphate monobasic ($KH_2PO_4$), phosphoric acid ($H_3PO_4$), magnesium sulfate ($MgSO_4$), ammonium phosphate monobasic ($NH_4H_2PO_4$), calcium sulfate ($CaSO_4$) and any combination thereof. In some embodiments, methods of the present invention provide an acid-base cement that includes at least one base source selected from the group consisting of magnesium oxide (MgO), zinc oxide (ZnO), ammonia ($NH_3$), calcium oxide (CaO) and any combination thereof. For example, in some embodiments, the acid-base cement comprises a Sorel cement comprising magnesium, zinc, or mixtures thereof. In some embodiments, the Sorel cement is based on magnesium. In some embodiments, the Sorel cement has a formula $Mg_4Cl_2(OH)_6(H_2O)_8$. In some embodiments, the Sorel cement is a zinc variant employing zinc chloride and zinc oxide.

In some embodiments, methods of the invention include an acid-base cement that further includes a Friedel's salt comprising calcium. Friedel's salt has the general formula $Ca_2Al(OH)_6(Cl, OH)2H_2O$. The use of Friedel's salt may aid in the retention of chloride anions in the acid-base cements used in methods of the invention. In some embodiments, the inclusion of Friedel's salt may aid the stability of salt-saturated acid-base cements.

In some embodiments, methods of the invention include a particulate filler that includes at least one selected from the group consisting of a carbonate salt, calcined magnesium oxide, calcined calcium oxide, and any combination thereof. In some embodiments, the particulate filler includes any acid soluble sized calcium carbonate. Examples of commercially available reagents include, without limitation, BARA-CARB® 25, 50 or 150 sized calcium carbonate. In some such embodiments, the particulate filler comprises a particle size in a range from about 5 microns to about 2000 microns, including any value in-between and fractions thereof. In some embodiments, the particulate filler comprises a particle size in a range from about 5 microns to about 400 microns, including any value in-between and fractions thereof. In some embodiments, the particulate filler is substantially monodisperse. In some such embodiments, the particulate filler may include an average particle size of about 5, 10, 20, 50, 75, 100, 125, 150, 175, 200, 225, 250, 275, 300, 325, 350, 375, or about 400 microns, including any value in-between and fractions thereof. In some embodiments, the particulate filler is substantially polydisperse and may include particles in a range from about 5 microns to about 400 microns, including any value in-between and fractions thereof. In some embodiments a substantially polydisperse particulate filler may include a particle size in a range from about 5 to about 250 microns, including any value in-between and fractions thereof. In some embodiments, the particulate filler may be bidisperse. In some such embodiments, the bidisperse particulate filler may include particles in a range from about 5 microns to about 100 microns, including any value in-between and fractions thereof, and particles in a range from about 300 microns to about 400 microns, including any value in-between and fractions thereof.

In some embodiments, methods of the invention include a solid acid precursor that includes at least one selected from the group consisting of polylactic acid, polyvinylacetate, a polycaprolactone, a polyglycolide, a polyethylene adipate, a polyhydroxyalkanoate, a polyethylene terephthalate, a polybutylene terephthalate, a polytrimethylene terephthalate, a polyethylene naphthalate, benzoic acid, p-toluene sulfonic acid, alumina, silica, a zeolite, aluminum phosphate, a heteropolyacid, a sulfated metal oxide, metal acetates, metal formates and any combination thereof.

In some embodiments, the solid acid precursor may include substantially insoluble acids that may provide a delayed or slow-release form of available acid to modulate the rate of degradation of the particulate filler. For example, the solid acid precursor may include relatively water insoluble organic acids such as benzoic acid or p-toluenesulfonic acid.

In some embodiments, the solid acid precursor may be any solid inorganic acid, such as a heteropoly acid. Heteropoly acids may include any group V or group VI transition metal of high oxidation state ($d^0$ or $d^1$) in a polyoxometalate type structure in the form of a phosphate, silicate, arsenate, or the like. Non-limiting examples of transition metal polyoxometalates include those derived from vanadium, niobium, tanatalum, molybdenum, and tungsten.

Sulfated metal oxides include those of general formula $MO_x/SO_4$, where M is a metal and x is an integer from 1 to 4. For example, M may be zirconium, tin, titanium, or any other competent Lewis acidic transition metal.

In some embodiments, methods of the invention employ the solid acid precursor in at least one form selected from the group consisting of a particle, a fiber, a chopped tow or yarn, and any combination thereof. Without being bound by theory, by providing the solid acid precursor in fiberous form, the strength of the set cement may be enhanced. In some such embodiments, the solid acid precursor may be a polymer such as polylactic acid, polyvinylacetate, a polycaprolactone, a polyglycolide, a polyethylene adipate, a polyhydroxyalkanoate, a polyethylene terephthalate, a polybutylene terephthalate, a polytrimethylene terephthalate, a polyethylene naphthalate, or combinations thereof.

In some embodiments, methods of the invention may employ cement compositions in which the cement sets in less than 10 minutes. In some embodiments, methods of the invention may employ cement compositions in which the cement sets in about 20 minutes, about 30 minutes, about 40 minutes, about 50 minutes, about 60 minutes, about 90 minutes, about 2 hours, about 2.5 hours, or in about 3 hours. In some embodiments, where the method is used in severe fluid loss application the set time may be selected to be at the short end, including about 10 minutes. In some embodiments, the set time may be even less than 10 minutes. The setting time may be limited solely by the ability to timely deliver the cement to the zone where fluid loss control is desired.

In some embodiments, methods of the invention further include augmenting degradation of the set cement via acid fracture. In some such embodiments, the degradation may be yet further enhanced through heating. In some embodiments, the use of an acid fracture may be used to substantially degrade the cement to provide a highly porous mass to aid in release of fluids from the formation to the wellbore.

In some embodiments, the present invention provides a self-degrading cement for fluid loss control comprising an acid-base cement; a particulate filler; and a solid acid precursor, wherein a setting time for the self-degrading cement is less than about three hours.

In some embodiments, the acid-base cement of the self-degrading cement comprises any combination of a Lewis acid (electron pair acceptor) with a Lewis base (electron pair donor). In some embodiments, the acid-base cement is a non-hydraulic cement. Non-hydraulic cements may be created, for example, using materials such as non-hydraulic lime and gypsum plasters, and oxychloride, which has liquid properties.

A broad variety of acid sources and base sources may be suitable for use in the self-degrading cement compositions of the present invention. Examples of suitable acid sources include, inter alia, magnesium chloride ($MgCl_2$), potassium phosphate monobasic ($KH_2PO_4$), phosphoric acid ($H_3PO_4$), magnesium sulfate ($MgSO_4$), and ammonium phosphate monobasic ($NH_2PO_4$). Examples of suitable base sources include, inter alia, magnesium oxide (MgO), calcium oxide (CaO) and ammonia ($NH_3$). An example of a suitable source of magnesium oxide is commercially available from Martin Marietta under the trade name "MagChem 10." An example of a suitable source of potassium phosphate monobasic is commercially available from Fisher Scientific.

Generally, an acid source and base source may be chosen that may react so as to form an acid-base cement. For example, magnesium oxide may be chosen as a base source, and potassium phosphate monobasic may be chosen as an acid source, so that in the presence of water they may react to produce an acid-base cement having the chemical formula $MgKPO_4$—$OH_2O$. As another example, magnesium oxide may be chosen as a base source, and magnesium chloride may be chosen as an acid source, so that in the presence of water they may react to produce an acid-base cement having three oxychloride phases; one oxychloride phase may have the chemical formula 5 Mg(OH$_2$)MgCl$_2$-8H$_2$O, which may be referred to as "5-form." As another example, magnesium oxide may be chosen as a base source, and phosphoric acid may be chosen as an acid source, so that in the presence of water they may react to produce an acid-base cement having the chemical formula MgHPO$_4$—5H$_2$O. As still another example, magnesium oxide may be chosen as a base source, and magnesium sulfate may be chosen as an acid source, so that in the presence of water they may react to produce an acid-base cement having four possible oxysulfate phases; one oxysulfate phase may have the chemical formula 3 Mg(OH)$_2$MgSO$_4$-8H$_2$O, which may be referred to as "3-form." As still another example, magnesium oxide may be chosen as a base source, and ammonium phosphate monobasic may be chosen as an acid source, so that in the presence of water they may react to produce an acid-base cement having the chemical formula Mg(NH$_4$)PO$_4$—OH$_2$O. A broad variety of acid sources and base sources may be used as described herein above.

Generally, the acid source and base source may be present in a stoichiometric amount. For example, in certain embodiments of the present invention wherein magnesium oxide is used as a base source and potassium phosphate monobasic is used as an acid source, their relative concentrations may be illustrated by EQUATION 1, as shown above.

Again, EQUATION 1 is merely exemplary, and may be modified as one of ordinary skill in the art will recognize, with the benefit of this disclosure. For example, additional quantities of magnesium oxide may be included, in amounts in the range of from about 1% excess by weight to about 25% excess by weight.

In some embodiments, cement compositions of the invention provide an acid-base cement that includes at least one acid source selected from the group consisting of magnesium chloride (MgCl$_2$), zinc chloride (ZnCl$_2$), potassium phosphate monobasic (KH$_2$PO$_4$), phosphoric acid (H$_3$PO$_4$), magnesium sulfate (MgSO$_4$), ammonium phosphate monobasic (NH$_4$H$_2$PO$_4$), calcium sulfate (CaSO$_4$), and any combination thereof. In some embodiments, methods of the present invention provide an acid-base cement that includes at least one base source selected from the group consisting of magnesium oxide (MgO), zinc oxide (ZnO), ammonia (NH$_3$), calcium oxide (CaO), and any combination thereof. For example, in some embodiments, the acid-base cement comprises a Sorel cement comprising magnesium, zinc, or mixtures thereof. In some embodiments, the Sorel cement is magnesium-based. In some embodiments, the Sorel cement has a formula Mg$_4$Cl$_2$(OH)$_6$(H$_2$O)$_8$ In some embodiments, the Sorel cement is a zinc variant employing zinc chloride and zinc oxide.

In some embodiments, self-degrading cement compositions of the invention include an acid-base cement that further includes a Friedel's salt comprising calcium. Friedel's salt has the general formula Ca$_2$Al(OH)$_6$(Cl, OH).2H$_2$O. The use of Friedel's salt may aid in the retention of chloride anions in the acid-base cements used in methods of the invention. In some embodiments, the inclusion of Friedel's salt may aid the stability of salt-saturated acid-base cements.

In some embodiments, self-degrading cement compositions of the invention include a particulate filler that includes at least one selected from the group consisting of a carbonate salt, calcined magnesium oxide, calcined calcium oxide, and any combination thereof. In some embodiments, the particulate filler is any acid soluble sized calcium carbonate reagent. In some embodiments, the particulate filler includes BARA-CARB® 25, 50 or 150 sized calcium carbonate. In some such embodiments, the particulate filler comprises a particle size in a range from about 1 micron to about 3500 microns. In some embodiments, the particulate filler comprises a particle size in a range from about 5 microns to about 400 microns. In some embodiments, the particulate filler is substantially monodisperse. In some such embodiments, the particulate filler may include an average particle size of about 5, 10, 20, 50, 75, 100, 125, 150, 175, 200, 225, 250, 275, 300, 325, 350, 375, or about 400 microns, including any value in-between and fractions thereof. In some embodiments, the particulate filler is substantially polydisperse and may include particles in a range from about 5 microns to about 400 microns. In some embodiments a substantially polydisperse particulate filler may include a particle size in a range from about 5 to about 250 microns. In some embodiments, the particulate filler may be bidisperse. In some such embodiments, the bidisperse particulate filler may include particles in a range from about 5 microns to about 100 microns and particles in a range from about 300 microns to about 400 microns.

In some embodiments, self-degrading cement compositions of the invention include a solid acid precursor that includes at least one selected from the group consisting of polylactic acid, polyvinylacetate, a polycaprolactone, a polyglycolide, a polyethylene adipate, a polyhydroxyalkanoate, a polyethylene terephthalate, a polybutylene terephthalate, a polytrimethylene terephthalate, a polyethylene naphthalate, benzoic acid, p-toluene sulfonic acid, alumina, silica, a zeolite, aluminum phosphate, a heteropolyacid, a sulfated metal oxide, metal acetates, metal formates, and any combination thereof.

In some embodiments, the solid acid precursor may include substantially insoluble acids that may provide a delayed or slow-release form of available acid to modulate the rate of degradation of the particulate filler. For example, the solid acid precursor may include relatively water insoluble organic acids such as benzoic acid or p-toluenesulfonic acid.

In some embodiments, the solid acid precursor may be any solid inorganic acid, such as a heteropoly acid. Heteropoly acids may include any group V or group VI transition metal of high oxidation state ($d^0$ or $d^1$) in a polyoxometalate type structure in the form of a phosphate, silicate, arsenate, or the like. Non-limiting examples of transition metal polyoxometalates include those derived from vanadium, niobium, tanatalum, molybdenum, and tungsten, including any combination thereof.

Sulfated metal oxides include those of general formula MO$_x$/SO$_4$, where M is a metal and x is an integer. For example, M may be zirconium, tin, titanium, or any other competent Lewis acidic transition metal.

In some embodiments, self-degrading cement compositions of the invention employ the solid acid precursor in at least one form selected from the group consisting of a particle, a fiber, a chopped tow or yarn, and any combination thereof. Without being bound by theory, by providing the solid acid precursor in fiberous form, the strength of the set cement may be enhanced. In some such embodiments, the solid acid precursor may be a polymer such as polylactic acid, polyvinylacetate, a polycaprolactone, a polyglycolide, a polyethylene adipate, a polyhydroxyalkanoate, a polyethylene terephthalate, a polybutylene terephthalate, a polytrimethylene terephthalate, or a polyethylene naphthalate, or combinations thereof.

In some embodiments, self-degrading compositions may be foamed. A foamed cement composition generally may be prepared by mixing a gas, such as air or nitrogen, with the cement composition. Foamed cement compositions may further comprise a variety of surfactants commonly referred to as "foaming agents" for facilitating the foaming of the cement composition and various other surfactants commonly referred to as "foam stabilizers" for preventing the components of the foamed cement composition from prematurely separating.

Further, the cement compositions of the present invention optionally may be foamed using a suitable gas (such as air or nitrogen, or a combination thereof) and a foaming agent. Among other things, the foaming agent may act to facilitate the formation and stabilization of a foamed cement composition. Suitable foaming agents include, but are not limited to, anionic or amphoteric surfactants, or combinations thereof, such as, for example, a mixture of an ammonium salt of alcohol ether sulfate (HOWCO-SUDS™ foaming agent) and cocoylamidopropyl betaine (HC-2™ foaming agent), commercially available from Halliburton Energy Services, Inc., Duncan, Okla.; a 2:1 mixture of the sodium salt of alpha-olefin sulfonate (AQF-2™ foaming agent) and cocylamidopropyl betaine (HC-2™ foaming agent), commercially available from Halliburton Energy Services, Inc., Duncan, Okla.; and a mixture of an ethoxylated alcohol ether sulfate, an alkyl or alkyene amidopropyl betaine and an alkyl or alkene amidopropyldimethylamine oxide, commercially available from Halliburton Energy Services, Inc. under the trade name ZONESEAL 2000™ foaming agent. Examples of suitable foaming agents are described in U.S. Pat. Nos. 6,210,476; 6,063,738; 5,897,699; 5,875,845; 5,820,670; 5,711,801; and 5,588,489; the relevant disclosures of which are incorporated herein by reference. The foaming agent generally may be present in an amount sufficient to provide the desired foaming of the cement composition. In some embodiments, the foaming agent may be present in the cement compositions of the present invention in an amount in the range of from about 0.8% to about 5% by volume of the water. In some embodiments, the foaming agent may be present in an amount in the range of from about 2% by volume of the water.

Other additives suitable for use in subterranean well bore cementing operations also may be added to these compositions. Other additives, include, but are not limited to, defoamers, dispersants, retardants, accelerants, fluid loss control additives, weighting agents, vitrified shale, lightweight additives (e.g., bentonite, gilsonite, glass spheres, etc.), and fly ash, and combinations thereof. A person having ordinary skill in the art, with the benefit of this disclosure, will know the type and amount of additive useful for a particular application and desired result.

In some embodiments, self-degrading compositions of the invention may employ cement compositions in which the cement sets in less than 10 minutes. In some embodiments, methods of the invention may employ cement compositions in which the cement sets in about 20 minutes, about 30 minutes, about 40 minutes, about 50 minutes, about 60 minutes, about 90 minutes, about 2 hours, about 2.5 hours, or in about 3 hours. In some embodiments, where the method is used in severe fluid loss application the set time may be selected to be at the short end, including about 10 minutes. In some embodiments, the set time may be even less than 10 minutes. The setting time may be limited solely by the ability to timely deliver the cement to the zone where fluid loss control is desired.

Although the detailed description contains many specifics, these should not be construed as limiting the scope of the subject technology but merely as illustrating different examples and aspects of the subject technology. It should be appreciated that the scope of the subject technology includes any combination of embodiments not discussed in detail above. Thus, in a method comprising placing a self-degrading cement composition in at least one fracture of a subterranean formation, the self-degrading cement comprising an acid-base cement, a particulate filler, and a solid acid precursor, and allowing the self-degrading cement to set in the fracture, a setting time of the cement composition may be in a range from about 1 minute to about 300 minutes or in a range from about 5 minutes to about 10 minutes, wherein the fracture optionally includes a thief zone and the acid-base cement may include at least one acid source selected from the group consisting of magnesium chloride ($MgCl_2$), zinc chloride ($ZnCl_2$), potassium phosphate monobasic ($KH_2PO_4$), phosphoric acid ($H_3PO_4$), magnesium sulfate ($MgSO_4$), ammonium phosphate monobasic ($NH_4H_2PO_4$), calcium sulfate ($CaSO_4$) and any combination thereof, and the acid-base cement may include at least one base source selected from the group consisting of magnesium oxide (MgO), zinc oxide (ZnO), ammonia ($NH_3$), calcium oxide (CaO) and any combination thereof, or the acid-base cement may comprise a Sorel cement comprising magnesium, zinc, or mixtures thereof, or optionally the acid-base cement may include a Friedel's salt comprising calcium, and the particulate filler may comprise at least one selected from the group consisting of a carbonate salt, calcined magnesium oxide, calcined calcium oxide, and any combination thereof, and the particulate filler may include a particle size in a range from about 1 micron to about 3500 microns, and the solid acid precursor may include at least one selected from the group consisting of polylactic acid, polyvinylacetate, a polycaprolactone, a polyglycolide, a polyethylene adipate, a polyhydroxyalkanoate, a polyethylene terephthalate, a polybutylene terephthalate, a polytrimethylene terephthalate, a polyethylene naphthalate, benzoic acid, p-toluene sulfonic acid, alumina, silica, a zeolite, aluminum phosphate, a heteropolyacid, a sulfated metal oxide, metal acetates, metal formates, and any combination thereof, and the solid acid precursor may include at least one form selected from the group consisting of a particle, a fiber, a chopped tow or yarn, and any combination thereof, and the method may further include augmenting degradation of the set cement via an acid fracture.

Likewise, in a self-degrading cement for fluid loss control comprising a cement composition comprising an acid-base cement, a particulate filler, and a solid acid precursor, wherein a setting time for the self-degrading cement is less than about three hours, the acid-base cement may include at least one acid source selected from the group consisting of magnesium chloride ($MgCl_2$), zinc chloride ($ZnCl_2$), potassium phosphate monobasic ($KH_2PO_4$), phosphoric acid ($H_3PO_4$), magnesium sulfate ($MgSO_4$), ammonium phosphate monobasic ($NH_4H_2PO_4$), calcium sulfate ($CaSO_4$) and any combination thereof, and the acid-base cement may include at least one base source selected from the group consisting of magnesium oxide (MgO), zinc oxide (ZnO), ammonia ($NH_3$), calcium oxide (CaO) and any combination thereof, or the acid-base cement may include a Sorel cement comprising magnesium, zinc, or mixtures thereof, and the particulate filler may include a carbonate salt, and the carbonate salt may include a particle size in a range from about 1 micron to about 3500 microns, and the solid acid precursor may include at least one selected from the group consisting of polylactic acid, polyvinylacetate, a polycaprolactone, a polyglycolide, a polyethylene adipate, a polyhydroxyalkanoate, a polyethylene terephthalate, a polybutylene terephthalate, a polytrimethylene terephthalate, a polyethylene naphthalate, benzoic acid, p-toluene sulfonic acid, alumina, silica, a zeolite, aluminum phosphate, a heteropolyacid, a sulfated metal oxide, metal acetates, metal formates and any combination thereof, and the solid acid precursor comprises at least one form selected from the group consisting of a particle, a fiber, a chopped tow or yarn, and any combination thereof.

Thus, in methods and compositions disclosed herein, the acid-base cement may include, for example, magnesium chloride ($MgCl_2$) and magnesium oxide (MgO), magnesium chloride ($MgCl_2$) and ammonia ($NH_3$), magnesium chloride ($MgCl_2$) and calcium oxide (CaO), ($MgCl_2$) and zinc oxide (ZnO), zinc chloride ($ZnCl_2$) and magnesium oxide (MgO), zinc chloride ($ZnCl_2$) and ammonia ($NH_3$), zinc chloride ($ZnCl_2$) and calcium oxide (CaO), zinc chloride ($ZnCl_2$) and zinc oxide (ZnO), potassium phosphate monobasic ($KH_2PO_4$) and magnesium oxide (MgO), potassium phosphate monobasic ($KH_2PO_4$) and ammonia ($NH_3$), potassium phosphate monobasic ($KH_2PO_4$) and calcium oxide (CaO), potassium phosphate monobasic ($KH_2PO_4$) and zinc oxide (ZnO), phosphoric acid ($H_3PO_4$) and magnesium oxide (MgO), phosphoric acid ($H_3PO_4$) and zinc oxide (ZnO), phosphoric acid ($H_3PO_4$) and ammonia ($NH_3$), phosphoric acid ($H_3PO_4$) and calcium oxide (CaO), magnesium sulfate ($MgSO_4$) and magnesium oxide (MgO), magnesium sulfate ($MgSO_4$) and zinc oxide (ZnO), magnesium sulfate ($MgSO_4$) and ammonia ($NH_3$), magnesium sulfate ($MgSO_4$) and calcium oxide (CaO), ammonium phosphate monobasic ($NH_4H_2PO_4$) and magnesium oxide (MgO), ammonium phosphate monobasic ($NH_4H_2PO_4$) and zinc oxide (ZnO), ammonium phosphate monobasic ($NH_4H_2PO_4$) and ammonia ($NH_3$), ammonium phosphate monobasic ($NH_4H_2PO_4$) and calcium oxide (CaO), calcium sulfate ($CaSO_4$) and magnesium oxide (MgO), calcium sulfate ($CaSO_4$) and zinc oxide (ZnO), calcium sulfate ($CaSO_4$) and ammonia ($NH_3$), calcium sulfate ($CaSO_4$) and calcium oxide (CaO), any such combinations may be used in further combination with each other.

To facilitate a better understanding of the present invention, the following examples of preferred or representative embodiments are given. In no way should the following examples be read to limit, or to define, the scope of the invention.

EXAMPLES

In the following examples, cement compositions were prepared and tested in accordance with API standards set forth in API RP10B.

Example I

Table 1 below shows a composition that was prepared in accordance with embodiments of the invention. The acid-base cement comprises MgO-LT and $KH_2PO_4$. Pozz-A and basalt were added as extenders/fillers and boric acid as a cement retarder.

TABLE 1

| Materials | Amount (g) |
| --- | --- |
| Water | 200 |
| MgO-LT (ANL, white) | 100 |
| $KH_2PO_4$ | 200 |
| Pozz-A | 300 |
| Basalt | 40 |
| Boric acid (3%) | 3 |

The compressive strength of the resultant set composition was 3300 psi at 23 hours at room temperature.

Example II

Table 2 below shows a composition that was prepared in accordance with embodiments of the invention. The acid-base cement comprises T-Tek-HT (Halliburton, Duncan, Okla.) and $NaH_2PO_4$. Pozz-A was added as an extender/filler and boric acid as a cement retarder.

TABLE 2

| Materials | Amount (g) |
| --- | --- |
| Water | 100 |
| T-Tek-HT | 50 |
| $NaH_2PO_4$ | 132 |
| Pozz-A | 182 |
| Boric acid (10.6%) | 5.3 |

The compressive strength of the resultant set composition was 1998 psi at 23 hours at room temperature.

Table 3 below shows a composition that was prepared in accordance with embodiments of the invention. The acid-base cement comprises T-Tek-HT (Halliburton, Duncan, Okla.) and $KH_2PO_4$. Pozz-A was added as an extender/filler, dextrose and boric acid were added as cement retarders, and WG-11 was added as a gelling agent/viscosifier.

TABLE 3

| Materials | Amount |
| --- | --- |
| Water | 450 |
| T-Tek-HT | 150 |
| $KH_2PO_4$ | 450 |
| Pozz-A | 600 |
| Dextrose-retarder | 24 |
| Boric acid-retarder | 24 |
| WG-11 | 1.2 |

The thickening time at about 190° F. and 3000 psi was about 5.5 hours pump time. The slurry was conditioned at 190° F. for 3:30 and cubes were poured for strength testing using the ultrasonic cement analyzer (UCA) system. For this purpose the water bath and UCA were preheated. Two cubes tested had a strength of about 1395 psi at 24 hours in the water bath. The 190° F.-UCA crush strength was about 1400 psi after about 48 hours.

Example IV

Tables 4 and 5 below show various compositions prepared in accordance with embodiments of the invention. All quantities are in grams (g). Thickening times were measured at the indicated temperatures at 3000 psi with a 35 minute ramp. Compositions were prepared with variable quantities of cement retarders.

TABLE 4

| Materials | Test #1 | Test #2 | Test #3 | Test #4 |
| --- | --- | --- | --- | --- |
| Water | 300 | 300 | 300 | 300 |
| T-Tek-HT (New) | 100 | 100 | 100 | 100 |
| $KH_2PO_4$ | 300 | 300 | 300 | 300 |
| Pozz-A | 400 | 400 | 400 | 400 |
| Dextrose | 18 | 12 | 0 | 0 |
| Boric acid | 18 | 18 | 18 | 10 |
| WG-11 | 0.8 | 0.8 | 0.8 | 0.8 |
| Temperature | 190 F. | 190 F. | 190 F. | 190 F. |
| Thickening Time | 12.5 hr | 11 hr | 9 hr 35 min. | 45 min |

TABLE 5

| Materials | Test #1 | Test #2 | Test #3 |
|---|---|---|---|
| Water | 300 | 300 | 300 |
| T-Tek-HT (New) | 100 | 100 | 100 |
| $KH_2PO_4$ | 300 | 300 | 300 |
| Pozz-A | 400 | 400 | 400 |
| Boric acid | 10 | 14 | 18 |
| WG-11 | 0.8 | 0.8 | 0.8 |
| Temperature | 190 F. | 190 F. | 190 F. |
| Thickening Time | 1 hr | 3 hr | 7 hr |

The results show the ability to fine tune the cement thickening time by varying the amounts and types of cement retarders.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods may also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   placing a self-degrading cement composition in at least one fracture of a subterranean formation, the self-degrading cement comprising:
      an acid-base cement;
      a particulate filler; and
      a solid acid precursor; and
   allowing the self-degrading cement to set in the fracture.

2. The method of claim 1, wherein a setting time of the cement composition is in a range from about 1 minute to about 300 minutes.

3. The method of claim 1, wherein a setting time of the cement composition is in a range from about 5 minutes to about 10 minutes.

4. The method of claim 1, wherein the fracture includes a thief zone.

5. The method of claim 1, wherein the acid-base cement comprises at least one acid source selected from the group consisting of magnesium chloride ($MgCl_2$), zinc chloride ($ZnCl_2$), potassium phosphate monobasic ($KH_2PO_4$), phosphoric acid ($H_3PO_4$), magnesium sulfate ($MgSO_4$), ammonium phosphate monobasic ($NH_4H_2PO_4$), calcium sulfate ($CaSO_4$) and any combination thereof.

6. The method of claim 1, wherein the acid-base cement comprises at least one base source selected from the group consisting of magnesium oxide (MgO), zinc oxide (ZnO), ammonia ($NH_3$), calcium oxide (CaO) and any combination thereof.

7. The method of claim 1, wherein the acid-base cement comprises a Sorel cement comprising magnesium, zinc, or mixtures thereof.

8. The method of claim 1, wherein the acid-base cement comprises a Friedel's salt comprising calcium.

9. The method of claim 1, wherein the particulate filler comprises at least one selected from the group consisting of a carbonate salt, calcined magnesium oxide, calcined calcium oxide, and any combination thereof.

10. The method of claim 9, wherein the particulate filler comprises a particle size in a range from about 1 micron to about 3500 microns.

11. The method of claim 1, wherein the solid acid precursor comprises at least one selected from the group consisting of polylactic acid, polyvinylacetate, a polycaprolactone, a polyglycolide, a polyethylene adipate, a polyhydroxyalkanoate, a polyethylene terephthalate, a polybutylene terephthalate, a polytrimethylene terephthalate, a polyethylene naphthalate, benzoic acid, p-toluene sulfonic acid, alumina, silica, a zeolite, aluminum phosphate, a heteropolyacid, a sulfated metal oxide, metal acetates, metal formates, and any combination thereof.

12. The method of claim 1, wherein the solid acid precursor comprises at least one form selected from the group consisting of a particle, a fiber, a chopped tow or yarn, and any combination thereof.

13. The method of claim 1, further comprising augmenting degradation of the set cement via an acid fracture.

* * * * *